United States Patent [19]

Chen et al.

[11] Patent Number: 4,776,866
[45] Date of Patent: Oct. 11, 1988

[54] METHOD FOR MAKING EXTRUDED WHISKER-REINFORCED CERAMIC MATRIX COMPOSITES

[75] Inventors: Shih-Lu Chen, Painted Post; Kishor P. Gadkaree, Big Flats; Joseph F. Mach, Corning, all of N.Y.

[73] Assignee: Corning Glass Works, Corning, N.Y.

[21] Appl. No.: 42,114

[22] Filed: Apr. 23, 1987

[51] Int. Cl.$^4$ .............................................. C03C 10/08
[52] U.S. Cl. ......................................... 65/33; 264/63
[58] Field of Search ..................... 264/63, 332; 501/95; 65/33

[56] References Cited

U.S. PATENT DOCUMENTS 4,464,192  8/1984  Layden et al. ......................... 501/95
4,615,987  10/1986  Chyung et al. ........................ 501/95

Primary Examiner—Ivars Cintins
Attorney, Agent, or Firm—Kees van der Sterre

[57] ABSTRACT

Whisker-reinforced ceramic matrix composites comprising a principal crystal phase selected from the group of anorthite, barium-stuffed cordierite, and mixed cordierite/anorthite are prepared by extrusion of extrudable ceramic batches comprising an extrusion vehicle and a solids component consisting essentially of inorganic whiskers and powdered glass, the glass being a thermally crystallizable glass containing an internal nucleant and capable of being consolidated at ambient pressures or above to a dense consolidated preform which may be converted to a substantially glass-free whisker-reinforced ceramic matrix composite by thermal treatment.

10 Claims, 1 Drawing Sheet

METHOD FOR MAKING EXTRUDED WHISKER-REINFORCED CERAMIC MATRIX COMPOSITES

BACKGROUND OF THE INVENTION

The present invention is in the field of reinforced ceramic composites. More particularly, the invention relates to whisker-reinforced ceramic matrix composites comprising glass-ceramic matrices and being formed by a direct extrusion process.

The use of inorganic whiskers and fibers to reinforce glasses, glass-ceramics and ceramics has long been practiced. The literature frequently refers to whiskers as relatively short, single-crystal fibers of small diameter (less than 100 microns), while fibers are considered to be multicrystalline or amorphous and are generally sufficiently long to be used in woven or otherwise interlocking bundles, tows or cloth. Hence whiskers are typically incorporated as a randomly dispersed phase, while fibers are more frequently incorporated in a controlled oriented or interlocking alignment.

The mechanism of strengthening of glass or ceramic bodies by fibers is considered to be that of load transfer by the matrix to the fibers in shear. This load transfer shifts stress from the glass or ceramic matrix to the relatively long, high modulus fibers, while the fibers at the same time may act to impede crack propagation through the matrix material.

Whiskers are thought to impart strengthening by similar mechanism, but load transfer to whiskers by the matrix is more limited due to the limited length and aspect ratio of the whiskers. Theoretically, a whisker which is sufficiently short will not be loaded to the breaking point by the matrix under stress, and therefore full advantage cannot be taken of the high strength of the whiskers.

Among the fibers and whiskers which have been suggested for use as reinforcement for monmetal matrix materials are whiskers and/or fibers of silicon carbide, silicon nitride, alumina, glass, and carbon. Ceramic matrix materials which have been prepared for use in composites have included glasses, glass-ceramics, and conventional ceramics.

U.S. Pat. No. 4,324,843 describes a family of fiber-reinforced glass-ceramic composite bodies wherein the glass-ceramic matrix is of aluminosilicate composition and the reinforcing fibers consist of silicon carbide. U.S. Pat. No. 4,464,475 describes similarly reinforced glass-ceramics comprising barium osumilite as the predominant crystal phase, while U.S. Pat. No. 4,464,192 describes whisker-reinforced glass-ceramic composites of aluminosilicate composition.

U.S. Pat. No. 4,615,987 discloses composite whisker-reinforced glass-ceramic products wherein anorthite and/or barium-stuffed cordierite crystals are developed in the matrix, while U.S. Pat. No. 4,588,699 discloses fiber composites which include a barium-stuffed cordierite glass-ceramic matrix. In these cases, however, a hot-pressing consolidation process is used to achieve strong, dense products.

Glass-ceramics represent a particularly promising group of matrix materials for reinforced ceramics because of the processing advantages theoretically obtainable therewith. Hence, since they are derived by thermal crystallization of glasses of appropriate composition, composite products can be consolidated under the relatively mild conditions appropriate for the consolidation of glasses. Yet the glasses may be thermally crystallized during or subsequent to consolidation to crystalline materials, and if crystallization is complete and residual glassy phases eliminated, phase assemblages highly resistant to creep or dimensional change at elevated temperatures may be developed in the composite matrix.

The preferred forming practice for the manufacture of ceramic matrix composites generally involves consolidation under pressure at relatively high temperatures. Even where glasses are employed as the matrix material, the glass-whisker or glass-fiber mixtures making up preforms for such composites generally exhibit rather high effective viscosities even at elevated processing temperatures, due to the presence of whiskers and/or fibers therein. Thus procedures such as hot-pressing or hot isostatic pressing are generally required to minimize the presence of defects or voids in the composite matrix.

Of course, the need to process composite preforms at high temperatures and at superatmospheric pressures adds complexity and cost to the manufacturing operation. But since the presence of voids has been deemed unacceptable from the standpoint of achieving the desired strength and toughness in the composite material, such costs have been assumed as a necessary part of the production of these materials.

While extrusion processing seems attractive as an approach to the manufacture of complex shapes in whisker- or fiber-reinforced materials, this approach has not been utilized to any degree, either commercially or in development, because the consolidation of extruded preforms of complex shape cannot be conveniently accomplished under high-pressure conditions. Hence conventional hot-pressing cannot be used to consolidate extruded products such as tubular or honeycomb structures.

It is therefore a principal object of the present invention to provide an extrusion process for the production of whisker-reinforced ceramic products which yields articles of excellent toughness and high modulus of rupture strength without the need to utilize a pressure consolidation process.

It is a further object of the invention to provide a method for making whisker-reinforced ceramic matrix composites which, while in some cases yielding a product with some residual porosity, still provides the necessary strength and toughness for high-temperature structural applications.

It is a further object of the invention to provide a whisker-reinforced ceramic matrix composite article exhibiting unexpected strength and toughness for structural or other high-temperature applications.

It is a further object of the present invention to provide a method for extruding whisker-reinforced ceramic matrix composites which can yield substantially void-free composite ceramic articles.

Other objects and advantages of the invention will become apparent from the following description thereof.

SUMMARY OF THE INVENTION

The present invention provides an extrusion method for making whisker-reinforced ceramic matrix composites which provides products exhibiting excellent strength and toughness. The consolidation of extruded preforms to dense composite products can, in cases of simple extruded shapes, be carried out by hot-pressing but, most desirably, a pressureless consolidation procedure which is effective to provide high density products is instead employed.

Further, notwithstanding the presence of some residual porosity in consolidated composites in some extrudable systems within the scope of the invention, unexpectedly high strength and toughness in these extrudable systems are achieved. Hence, composite products suitable for direct use in heat engine and other high-temperature applications are provided.

Broadly characterized, the method of the invention comprises the steps of, first, compounding a whisker-containing ceramic extrusion batch for the product comprising a vehicle component and a solids component, wherein the solids component comprises a mixture of inorganic reinforcing whiskers and a selected powdered thermally crystallizable glass. The inorganic reinforcing whiskers, which generally constitute 1–30% by weight of the solids component of the batch, may consist of known inorganic whisker reinforcement materials such as SiC, alumina, HfC, or similar whiskers. The powdered thermally crystallizable glass, which makes up the remaining 70–99% by weight of the solids component of the batch, is selected from among those thermally crystallizable glasses hereinafter described which can be consolidated at ambient pressures to provide dense composite products of high strength and toughness.

Thermally crystallizable glasses which can be used to form the matrix of the composite product may be characterized as alkaline earth aluminosilicate glasses having liquidus temperatures below about 1600° C. and comprising one or more alkaline earth metal oxides selected from the group consisting of MgO, CaO and BaO. These glasses also contain an internal nucleating agent as an essential constituent, and are thermally crystallizable to a crystalline glass-ceramic material wherein anorthite (CaO Al$_2$O$_3$ 2SiO$_2$) or a mixture of anorthite and cordierite (2MgO 2Al$_2$O$_3$ 5SiO$_2$), or barium-stuffed cordierite constitutes the principal crystal phase. Glasses of appropriate composition within this composition field are relatively stable glasses and exhibit viscosity/liquidus characteristics and compatibility with selected inorganic reinforcement whiskers such that whisker-glass powder mixtures containing them can be consolidated at ambient pressures to high-density sintered preforms. The sintered preforms can thereafter be fully crystallized to dense products of relatively low or no residual porosity.

In the process of the invention, extrusion batches formulated as above described are extruded using conventional extrusion processing equipment to provide green ceramic preforms of a selected configuration. Extruded elements of rod, tube, or honeycomb configuration can easily be provided by this process, which cannot conveniently be made by lamination or other standard fiber composite preform fabrication techniques.

A green ceramic preform provided as described is next heated to a consolidation temperature above the softening temperature of the powdered glass, but below the temperature at which rapid glass flow with pore trapping, corresponding approximately to the slumping or deformation temperature of the preform, will occur. This consolidation temperature will generally not exceed a temperature which is 150° C. above the liquidus temperature of the selected glass.

The rate of heating to the consolidation temperature is controlled, being sufficiently rapid that complete crystallization of the preform during heating is avoided and residual glass sufficient to promote dense consolidation of the preform remains at the consolidation temperature. For the purpose of the present description, the consolidation temperature is that temperature, during heating, at which rapid shrinkage and densification of the porous preform commences. This temperature depends on both the whisker content and degree of crystallization of the body, but is readily measured by conventional dilatometric analysis. While high-pressure consolidation at this stage is possible, such is not essential to high product strength and density using the above-recited materials and process, and ambient pressure consolidation will advantageously be used to insure that preform deformation or other adverse change will not occur. Also, in most cases, it is preferred to carry out the consolidation in an inert atmosphere, to avoid whisker oxidation and other possibly harmful reactions.

The sintered preform thus provided is next cooled to at least the crystal nucleation range of the thermally crystallizable glass utilized to provide the matrix. The preform is maintained at temperatures in this nucleation range for a time sufficient to achieve internal nucleation of the sintered glass.

Finally, the sintered nucleated preform is heated to a temperature in the crystallization range of the nucleated glass, and is maintained in that temperature range for time sufficient to achieve complete crystallization of the matrix glass and thus a fully crystallized glass-ceramic matrix. Most preferably, crystallization will be continued for a time sufficient to completely crystallize all residual glassy phases in the matrix, so that the product will exhibit the highest possible creep resistance at high temperatures within the limitations of the particular crystal phase developed therein.

The product of the above-described process is a whisker-reinforced ceramic matrix composite essentially free of residual glassy phases which exhibits excellent high temperature strength and toughness notwithstanding the presence in some instances of residual porosity therein. The product will consist essentially of about 1–30% by weight of inorganic whiskers, 70–99% by weight of an alkaline earth aluminosilicate glass-ceramic matrix material comprising a principal crystal phase consisting of one or more crystal phases selected from the group of: anorthite, cordierite/anorthite, and barium-stuffed cordierite.

The product will typically have a density of at least 80% of the theoretical maximum density for the material, and preferably a density of 90–100% of theoretical. Yet the composite will generally exhibit a modulus of rupture strength in excess of 20,000 psi, and will also demonstrate excellent fracture toughness. These characteristics make the extruded composite products of the invention eminently suitable for applications such as components for heat engines and other high-temperature structural applications.

DESCRIPTION OF THE DRAWINGS

The invention may be further understood by reference to the drawings wherein.

DETAILED DESCRIPTION

As has been referred to above, extrusion processing has not previously been resorted to for preprocessed matrix materials such as glass because of the concern that extruded products of complex configuration could not be satisfactorily consolidated. One area of concern relates to the fact that, as the whisker component of a ceramic batch comprising a powdered glass matrix material is increased, a very rapid rise in the effective high-temperature viscosity of the mixture is observed. In this region the full consolidation of the batch to a dense, void-free product at ambient pressure has been considered to be increasingly difficult or impossible.

Another problem unique to pressureless consolidation relates to the need to simultaneously avoid both thermal disruption and premature crystallization of the preform. Low heating rates to the consolidation temperature are needed to avoid thermal disruption, while high rates are needed to avoid crystallization to an extent rendering pressureless consolidation ineffective, due to loss of matrix flowability.

In the prior art, these problems have been dealt with by increasing the temperature at which consolidation is effected and/or by increasing the pressure on the preform during consolidation. However such expedients cannot be resorted to where extruded preforms of complex configuration are desired. Attempts to achieve pressureless consolidation at higher temperatures will normally result in deformation or slumping of the composite preform, while pressure consolidation techniques cannot conveniently and efficiently be applied to complex extruded ceramic shapes without also risking deformation of the extruded structure. Moreover, we have found that, at temperatures corresponding approximately to the slumping temperature of the preform, or above, glass consolidation occurs in a way which traps pores in the composite, providing weak, highly porous products.

Of course, it has been recognized that the ultimate strength and toughness of the composite ceramic product will depend directly on the amount of reinforcing phases present therein. But while the effective amount of reinforcement incorporated in conventional composites is practically limited primarily by the pressure achievable during consolidation, these limits have not been deemed to be even approximately approached where pressureless consolidation is to be employed. Therefore, again, extrusion has not been considered a practical forming method where composite products of complex structure yet high strength and toughness have been needed.

We have now discovered that, through an appropriate selection of thermally crystallizable glass matrix materials and processing conditions, pressureless consolidation of extruded composite batches can indeed be achieved, with unexpectedly high strength and toughness exhibited by the extruded consolidated product.

Essential characteristics of matrix glasses to be utilized in providing dense composites in accordance with the invention include: glass stability, temperature-viscosity characteristics, and a liquidus temperature permitting effective whisker-wetting and flow without undue glass crystallization at ambient pressures; compatibility between the glass and the reinforcing whisker phase during and after the glass has been sintered; compatibility between the matrix and the reinforcing whiskers during and after the process of thermal crystallization of the matrix to convert the composite into a wholly crystalline refractory phase assemblage; and physical compatibility between the crystallized matrix phase and the whisker phase sufficient to yield the requisite strength and toughness in the product.

Selected alkaline earth aluminosilicate glasses have now been identified which simultaneously meet all of these essential requirements. For purposes of characterization and discussion, these glasses may conveniently be categorized in one of three identifiable groups. The first of these groups includes glasses containing CaO as the alkaline earth metal oxide, and which may be substantially free of MgO and BaO. These glasses will have compositions such that they can be thermally crystallized to a substantially glass-free crystalline glass-ceramic material wherein anorthite constitutes the principal crystalline phase.

The second identifiable group includes glasses containing both CaO and MgO as essential alkaline earth metal oxides, and which may be substantially free of BaO. These glasses will have compositions such that they can be thermally crystallized to a substantially glass-free crystalline glass-ceramic material wherein a mixture of anorthite and cordierite (referred to herein as cordierite/anorthite) constitutes the principal crystalline phase.

The third identifiable group of glasses useful according to the invention includes glasses containing both BaO and MgO as essential alkaline earth metal oxides, and which may be substantially free of CaO. These glasses will have compositions such that they can be thermally crystallized to a substantially glass-free crystalline glass-ceramic material wherein barium-stuffed cordierite constitutes the principal crystalline phase.

All of the glasses employed to provide glass-ceramic matrix materials in accordance with the present invention will comprise an internal nucleating agent. The nucleating agent may be selected from among any of the known agents which have been employed for the purpose of developing the selected crystal phases in glasses of these types in the prior art, but will preferably be chosen from the group consisting of: $ZrO_2$, $Cr_2O_3$, $MoO_3$, $HfO_2$, $Nb_2O_5$, $WO_3$ and $Ta_2O_5$. These agents are both generally effective and compatible with whisker reinforcement materials such as SiC.

The use of internal nucleating agents is an essential aspect of the invention because it insures that complete crystallization of the glass can be carried out following the consolidation step. As noted above, successful consolidation requires the presence of a significant proportion of residual glass at the consolidation temperature. With a composition containing a nucleant, the sintering can be carried out even above the liquidus temperature of the crystal phases, where glass viscosities are low. The glass can then be cooled to nucleate and crystallize the appropriate phases, and a homogeneous microstructure imparting high strength and temperatures to the product is achieved.

Glasses exist within each of the above composition systems which are sufficiently stable to resist complete crystallization in the course of processing to temperatures such as utilized to consolidate the whisker composites. The presence of the internal nucleant nevertheless insures that complete crystallization of the sintered glass can be achieved following a nucleating step after extruded preforms have been successfully consolidated above the glass liquidus.

Glasses having the compositions above described may be compounded and melted to form glasses utilizing conventional melting techniques. The batch may be compounded of any conventional batch ingredients, whether oxides or other compounds, which will be converted to the specified oxides in the proper proportions in the course of melting the batch.

The conversion of the glasses to glass powders suitable for incorporation in extrudable batch formulations involves finely dividing the glass, and normally comprises a milling step during which the particle size of the glass is reduced to very small and relatively uniform dimensions. For coarse granularization of the glasses, the glass melts as may be poured into water (dry-gaged) to obtain particulate glass, and the glass particles thus provided may then be ballmilled or otherwise comminuted to produce very fine glass powder. For extrusion in accordance with the invention, the glass powder will preferably have a particle size averaging 5–20 microns with a maximum particle size not exceeding about 100 microns.

The formation of extrusion batches comprising inorganic whiskers as well as glass powders is preferably accomplished by processing in a manner which will insure homogeneous dispersion of the whiskers in the powdered glass matrix material. Commercially available inorganic whiskers, e.g., commercially available silicon carbide whiskers, being of extremely fine particle size, are typically supplied in agglomerated form and must be thoroughly deagglomerated prior to incorporation in the batch. A useful technique for deagglomerating the whiskers and at the same time homogeneously mixing the whiskers with glass powder comprises, first, dispersing the whiskers in a liquid vehicle such as water by shearing action such as attainable in a high-speed blender to achieve thorough deagglomeration. After this has been accomplished, glass powder may be added to the whisker dispersion with further high-speed blending, and the dispersion vehicle then separated from the blended solids by filtration. The resulting solids mixture is sufficiently well blended to be incorporated directly into an extrusion batch for a composite ceramic product provided according to the invention.

An alternative approach to obtaining a homogeneous whisker-powder extrusion batch is to simply combine the whiskers with powdered glass in a small amount of a vehicle such as water or alcohol to form a heavy slurry. This slurry can then be processed, as by ballmilling, to break up any whisker agglomerates and homogenize the mixture.

To carry out the actual extrusion process, extrusion batches comprising conventional vehicle constituents for the production of extruded ceramic products may be employed. Typically, such vehicle formulations will include a major vehicle component, such as water, along with added binders and extrusion aids to achieve a strong green body which can be extruded at reasonable pressures. Suitable additives would include lubricants such as glycerine or the stearates and binders such as polyvinyl alcohols or cellulose ether products.

Actual extrusion of the powder-whisker batch may be accomplished utilizing conventional extrusion equipment and processing. The particle size of the whiskers is sufficiently small, e.g., whisker diameters not exceeding about one micron and whisker lengths which typically do not exceed about 50 microns, that no special problems with respect to extrusion are presented by the whisker-containing batches. Thus green ceramic preforms produced by extrusion in accordance with the invention typically exhibit excellent green strength, and may be easily inspected and handled prior to further processing.

The consolidation of the extruded preform to a dense ceramic matrix composite is preferably carried out in a two-stage process. The first stage, referred to as a burnout step, involves heating the preform under oxidizing conditions to a temperature sufficient to remove vehicle components such as water and organic constituents such as the binders and extrusion aids from the preform. Preferably, the preform is first heated in air at a relatively low temperature, e.g. below 150° C., to remove water, and is thereafter further heated in air to a temperature sufficient to remove organic constituents but insufficient to cause extensive consolidation or oxidation of the whiskers present in the preform. Temperatures in the range of about 300°–1050° C. are generally suitable for this stage of the process with temperatures at the higher end of this range being effective to cause some "pre-consolidation" sintering of the preform which adds green strength to the body. Heating rates during the burnout stage are kept sufficiently low to avoid disruption of the preform by vaporized byproducts.

After burnout has been completed, the preform is subjected to a sintering step wherein it is heated to a temperature sufficient to permit sintering of the powdered glass but insufficient to cause slumping or sagging of the preform. The heating is preferably carried out in an inert atmosphere, such as helium or nitrogen, especially where oxidation damage to the whiskers at sintering temperatures must be avoided.

Because the glasses forming the matrix of the extruded preform is powdered, it is prone to surface crystallization during consolidation. The extent of crystallization will depend on the rate of heating through the crystallization range, with rapid heating to consolidation producing less crystallization than slow heating. If crystallization proceeds too far, the preform cannot be consolidated at ambient pressure without slumping and loss of shape.

In general, extruded preforms provided according to the invention can be consolidated if at least about 15% of residual glass is present in the solid phase at the consolidation temperature, which for the purpose of the present description is defined as that temperature during heating at which rapid shrinkage of the preform commences, as determined by dilatometric analysis. Generally, little or no preform shrinkage can be observed below the consolidation temperature on a temperature-length dilatometer plot. More typically, and preferably, glass will constitute 25% or more of the solid phases at consolidation; the amount of residual glass can be readily determined by conventional x-ray analysis of the preforms.

Simple extruded shapes such as rods can be rapidly heated without disruption, and will therefore undergo only minimal crystallization during heating. Consolidation in that event may occur at or near the softening point of the glass. Complex extruded shapes, which are more slowly heated, can be 75% or more crystallized in the course of heating, and must therefore be heated close to or even above the liquidus temperature of the glass before consolidation commences.

In general, then, the pressureless consolidation of preforms in accordance with the invention involves heating the preform to a consolidation temperature above the softening point of the glass but not exceeding about 150° C. in excess of the glass liquidus temperature, with heating being carried out at a rate sufficient to retain at least 15% of residual glassy phases in the preform at the consolidation temperature.

Temperatures more than 150° C. above the glass liquidus risk preform deformation and pore entrapment, but temperatures in the range from the liquidus to 50° C. above the liqudus may in fact provide the best consolidation and highest strength in the product. Heating rates suitable for achieving high temperature consolidation can readily be determined by routine experiment, but for the preferred glasses herein described, heating rates of from 3°–15° C. per minute to consolidation temperatures of 1400°–1550° C. will normally be used.

After the green preform has been converted to a sintered preform, crystallization of the body may be carried out in accordance with conventional glass-ceramic processing procedures. Thus the sintered preform may be cooled to a temperature in the nucleation range for the glass, or heated to that temperature if cooled to ambient prior to crystallization, for example, to inspect the body. The preform is then maintained at a temperature in the nucleation range for a time sufficient to achieve full development of crystal nuclei in the glass. Generally, temperatures in the range of about 800° to 900° C. are useful for this purpose, with heating times in the range of 2 to 4 hours being sufficient to achieve full nucleation.

In some cases, particularly where calcium aluminosilicate glasses comprise the matrix phase to be crystallized, it may be desirable to avoid cooling the consolidated but uncrystallized preform to ambient temperatures prior to crystallization. For these products, the preferred practice is simply to cool the sintered preform to the nucleation range for the glass, and then to carry out crystallization directly, without cooling until conversion to a crystalline matrix has been completed.

Crystallization of the nucleated composite then can be completed by heating the nucleated glass to a temperature in the range of about 1100° to 1300° C. for a time in the range of 2 to 4 hours. This will provide a fully crystallized body exhibiting optimum resistance to high-temperature creep, as well as excellent strength and toughness.

Characterization of glass-ceramic matrix composites produced in accordance with the invention suggests that excellent strength and toughness values may be achieved notwithstanding the retention of varying amounts of porosity in the consolidated material. Hence, while densities in the product may range from as low as 80% to as high 100% of the theoretical maximum density for the particular whisker-crystal phase assemblage produced, excellent strength values are observed even in products exhibiting relatively high porosity. Thus, particularly in the preferred extruded composite ceramic products, having densities of 90–100% of theoretical modulus of rupture strengths in excess of 20,000 psi may routinely be achieved.

The following detailed examples set forth specific materials and procedures which may be utilized in the production of extruded ceramic matrix composites in accordance with the invention. These examples, however, are deemed to be illustrative and not limiting.

EXAMPLE I

A glass powder suitable for the manufacture of an extruded whisker-reinforced ceramic matrix composite is produced from a melt of calcium aluminosilicate glass by a milling process. A glass consisting essentially, in weight percent on the oxide basis as calculated from the batch, of about 39.5% $SiO_2$, 38.5% $Al_2O_3$, 18.4% CaO, 0.5% $As_2O_3$, and 3% $ZrO_2$ is compounded from conventional batch ingredients and formed into a glass melt by melting at 1650° C. for 16 hours. After stirring to insure melt homogeneity, the glass melt is fritted by pouring into water and the resulting coarse glass frit is milled in a ballmill for four hours to obtain thorough pulverization. The glass powder thus produced has a maximum particle size of about 50 microns and an average particle size of about 10 microns.

The calcium aluminosilicate glass powder thus provided is combined with a quantity of silicon carbide whiskers to produce a homogeneous powder-whisker mixture. This mixture is prepared by adding sufficient whiskers to the powdered glass to form a mixture comprising 20% whiskers by weight, then adding an isopropanol vehicle to the mixture to form a heavy slurry, and finally ball-milling the slurry for 4 hours. The homogeneous powder-whisker mixture thus provided is separated from the vehicle by filtration and dried.

To form an extrusion batch from the dry mixture thus provided, about 10 parts by weight of a methyl cellulose binder and one part by weight of a sodium stearate extrusion air per 100 parts of the whisker-glass mixture are added and the resulting batch thoroughly blended in a Littleford polyphase mixer to achieve thorough dispersion of the additives in the batch. Thereafter, the dry batch is introduced into a Lancaster countercurrent batch mixer and approximately 46 parts by weight of water for each 100 parts by weight of the dry batch are added. Mixing of this batch is continued for 0.5 hours to produce a homogeneous, plastic extrudable mass.

The extrusion batch thus provided is extruded through a standard honeycomb extrusion die to produce an extruded honeycomb preform having approximately 200 square cells per square inch of frontal surface area. Extrusion is carried out at a pressure of approximately 600 psi, the thickness of the cell walls of the honeycomb preform being approximately 18 mils.

The extruded green preform thus provided is next dried at 110° C. in a hot air oven for 16 hours, and then subjected to a burn-out treatment to remove organic binder and extrusion aid components. The preform is first heated at 50° C. per hour to 450° C., held at 450° C. for 16 hours, then further heated at 300° C. per hour to 800° C., held at 800° C. for 30 minutes, and finally cooled to room temperature. This treatment effects complete removal of organic constituents from the green preform.

The preform is next subjected to a thermal treatment to sinter the powdered glass into a continuous glass matrix phase. This sintering is carried out at ambient pressure in a nitrogen atmosphere by heating the preform at a rate of 500° C. per hour to 1500° C., and thereafter holding the preform at 1500° C. for 2 hours to achieve thorough sintering without crystallization.

The crystallization of the sintered preform is next carried out, without completely cooling the preform to room temperature, by cooling the preform only to a nucleation temperature for the glass (about 900° C.), and holding the sintered preform at that temperature for 2 hours to promote complete nucleation of the glassy matrix. Following this nucleation step, the nucleated preform is heated to 1200° C. and held at that temperature for 2 hours. This effects complete crystallization of the sintered glass matrix, which is transformed by the described thermal treatment to a fine-grained anorthite crystal phase.

Figure 1:
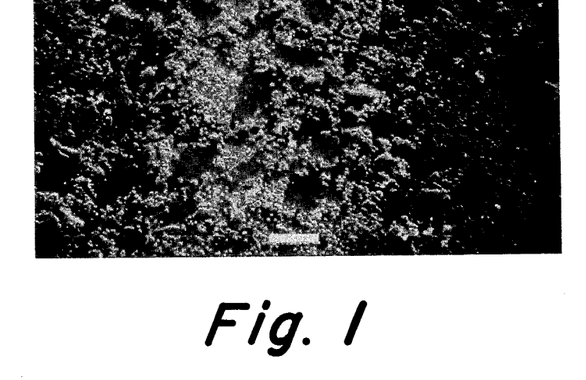
FIG. 1 is an electron photomicrograph of a cross-section of extruded whisker-reinforced ceramic matrix material provided in accordance with the invention.

The microstructure of an extruded ceramic matrix composite article produced as described is illustrated in FIG. 1 of the drawing. FIG. 1 is a scanning electron photomicrograph of a polished surface of the article wherein the white bar represents a dimension of 10 microns. The structure shows no evidence of residual porosity, indicating that essentially complete consolidation of the material is achieved during the sintering process. The material exhibits a compressive strength of approximately 38,000 psi, which represents an exceptionally high strength value, particularly for an extruded ceramic honeycomb structure of the geometry provided.

Figure 2:
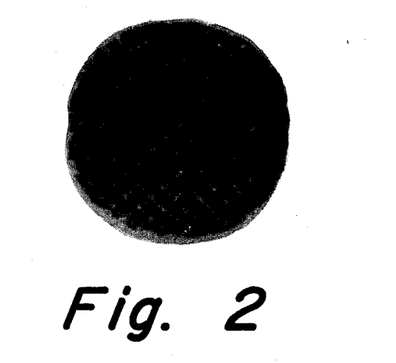
FIG. 2 is a photograph of an extruded whisker-reinforced ceramic matrix composite product provided in accordance with the invention.

FIG. 2 of the drawing is a photograph of a cross section of the extruded ceramic honeycomb article showing excellent retention of shape in the extruded product.

EXAMPLE II

A whisker-glass powder mixture such as reported in Example I is preferred as therein described, except that the mixture comprises 15 wt.% of whiskers and the remainder powdered glass by weight. An extrusion batch is prepared from this mixture by combining one part of a sodium stearate extrusion aid, 6 parts of a methyl cellulose binder, and 43 parts of water to each 100 parts of the glass-whisker mixture. Mixing and blending of the extrusion batch is carried out as described in Example I.

Extrusion of the batch thus provided is carried out at an extrusion pressure of 100 psi to form extruded bars having a width of approximately 0.5 inches and a thickness of approximately 0.125 inches. These extruded bars are cut into preforms of 4-inch length and then oven-dried for 16 hours at 110° C.

Following drying, the binder burnout process and sintering procedures of Example I are carried out to remove organic constituents from the preform and to consolidate the powdered glass into a continuous glassy matrix phase in which the carbide whiskers are disposed. The glassy preform is then nucleated and crystallized in accordance with the procedure described in Example I.

The glass-ceramic composite bars produced in accordance with this process exhibit a measureable degree of porosity (approximately 10% by volume). This result is attributed primarily to the use of relatively low extrusion pressure to form the preform. Despite the relatively high porosity, the consolidated crystallized composite has a flexural strength in bending of approximately 36,000 psi.

A comparison sample consisting of a whisker-free extruded glass ceramic bar is produced following the same procedure recorded above for the whisker-containing sample. Extrusion, binder burnout, sintering, and crystallization are accomplished using the same process conditions as above described. When subjected to modulus of rupture testing, whisker-free comparison samples produced as described exhibit a modulus of rupture strength in 4-point bending of about 10,000 psi. Thus the effectiveness of the whisker reinforcement in promoting high strength and toughness in the extruded product is evident.

While the use of higher extrusion pressure could be used to decrease porosity in the described samples, it is of course also possible to decrease porosity by consolidation of the extruded preform under pressure, provided that the sample configuration is simple. Thus preform bars produced as above and sintered to closed porosity described may be hot-isostatically pressed at 1200° C. for 2 hours under a pressure of 25,000 psi to significantly reduce the porosity in the consolidated product. For that process, flexural strengths of 41,000 psi have been found to be attainable. However, again, this type of processing would not be available where extruded preforms of complex configuration were required.

EXAMPLE III

An extrusion batch for a ceramic preform is prepared following the general procedure described in Example II above, except that the solids component of the extrusion batch is formulated to contain 20% by weight of reinforcing silicon carbide whiskers as used in Example I. The extrusion batch is then extruded at relatively low pressure (100 psi) as described in Example II, and then thermally processed as therein described to convert the green extruded preform to a crystallized composite ceramic product.

Due to the use of the relatively low extrusion pressure, and also because of the relatively high whisker content of the extrusion batch, both the green extruded preform and the consolidated composite product have a relatively large amount of porosity. Thus the flexural modulus of rupture strength of extruded bar samples of this composition is about 28,000 psi. While representing a considerable strength improvement over the whisker-free bar samples, this flexural strength does not represent the maximum strength attainable in this system.

To determine the effect of reduced porosity on samples such as described in Example III, green ceramic preforms extruded under the same conditions as described are sintered and then hot isostatically pressed at 1200° C. for 2 hours at 25,000 psi for consolidation, rather than simply being consolidated by pressureless sintering. The resulting consolidated composite products are then crystallized as described in Example I.

Hot-isostatic-pressed bar samples produced in accordance with this procedure had flexural modulus of rupture strengths of approximately 38,000 psi. The observed reduction in strength below that observed in the 15 wt.% whisker samples is attributed to the fact that the viscosity of the whisker-glass powder mixture is higher in the higher whisker content body. Thus hot isostatic pressing cannot completely eliminate open porosity where large whisker additions are employed.

As the foregoing examples suggest, low porosity in composite ceramic products produced by extrusion in accordance with the invention is more easily attained if the preform extrusion process is carried out at relatively high pressures. Reduced water and binder content in the extrusion batch is expected to give higher green densities and thus lower porosity in the crystallized product. Preferred extrusion pressures for this purpose generally are at least 500 psi and preferably in the range of 500-2000 psi.

The data also indicate a range of preferred whisker contents wherein good pressureless consolidation without preform sagging and excellent product strength may concurrently be attained. Thus preferred compositions provided in accordance with the invention will comprise 5-25% by weight of whiskers, most preferably SiC whiskers, with the glass-ceramic matrix making up the remaining 75-95% by weight of the product.

As previously noted, the composition of the glass matrix used to provide the ceramic matrix composites in accordance with the invention may vary considerably within the prescribed ranges while still yielding high density composite product. Table I below reports additional calcium aluminosilicate glass compositions within the range of glasses which may be consolidated and thermally crystallized to provide ceramic matrices of relatively low porosity and high strength. The compositions are reported in parts by weight, but the totals are close to 100 so that the reported values approximate weight percent values. While the sintering temperatures are not reported, such can be routinely determined from the liquidus for each composition in accordance with known analytical practice. In general, the best sintering (consolidation) temperatures for calcium aluminosilicate glasses of this type can be successfully carried out at 1400° C. or above, most preferably in the range of 1450° C. to 1550° C.

TABLE I

|  | 1 | 2 | 3 | 4 | 5 |
|---|---|---|---|---|---|
| $SiO_2$ | 40.8 | 39.5 | 40.8 | 40.8 | 40.8 |
| $Al_2O_3$ | 39.7 | 38.5 | 39.7 | 39.7 | 39.7 |
| CaO | 19.0 | 18.4 | 19.0 | 19.0 | 19.0 |
| $As_2O_3$ | 0.5 | 0.5 | 0.5 | 0.5 | 0.5 |
| $ZrO_2$ | — | — | — | — | — |
| $Cr_2O_3$ | 0.1 | — | — | — | — |
| $MoO_3$ | — | 3.0 | — | — | — |
| $HfO_2$ | — | — | 0.5 | — | — |
| $Nb_2O_5$ | — | — | — | 0.5 | — |
| $WO_3$ | — | — | — | — | 0.5 |

|  | 6 | 7 | 8 | 9 | 10 |
|---|---|---|---|---|---|
| $SiO_2$ | 40.8 | 40.8 | 40.4 | 39.0 | 37.8 |
| $Al_2O_3$ | 39.7 | 39.7 | 39.7 | 39.7 | 41.6 |
| CaO | 19.0 | 19.0 | 18.8 | 18.2 | 17.6 |
| $As_2O_3$ | 0.5 | 0.5 | — | — | 0.5 |
| $ZrO_2$ | — | — | 3.0 | 3.0 | 3.0 |
| $Cr_2O_3$ | 1.0 | — | — | — | — |
| $Ta_2O_5$ | — | 0.5 | — | — | — |

|  | 11 | 12 | 13 | 14 | 15 |
|---|---|---|---|---|---|
| $SiO_2$ | 38.9 | 36.5 | 37.1 | 35.4 | 36.1 |
| $Al_2O_3$ | 42.5 | 43.4 | 44.1 | 45.0 | 46.0 |
| CaO | 15.6 | 17.0 | 17.3 | 16.5 | 16.9 |
| $As_2O_3$ | 0.5 | 0.5 | 0.5 | 0.5 | 0.5 |
| $ZrO_2$ | 3.0 | — | 3.0 | 3.0 | 3.0 |
| $Nb_2O_5$ | — | — | 1.0 | — | 0.5 |

The examples in Table I illustrate the range of base glass composition useful in the $CaO$-$Al_2O_3$-$SiO_2$ composition system to produce glasses crystallizable to anorthite, and also show the range of internal nucleating agents which can be employed in accordance with the invention. These agents can in most cases be employed in glasses crystallizable to cordierite/anorthite and barium-stuffed cordierite as well as those crystallizable to anorthite. Minor amounts of other oxide may of course also be present in these systems provided they do not unduly affect the desirable chemical and physical characteristics of these glasses. In the case of calcium aluminosilicate glasses, for example, up to 5% of the alkali metal oxides $K_2O$ and $Na_2O$ may be present, as these can be incorporated in solid solution in the anorthite crystal phase. Preferred base glasses in the $CaO$-$Al_2O_3$-$SiO_2$ composition system will consist essentially, in weight percent, of about 35-41% $SiO_2$, 38-46% $Al_2O_3$, 16-20% CaO, and 0.1-5% of an internal nucleating agent, most preferably $ZrO_2$ or $Nb_2O_5$. They may optionally contain 0-2% $Al_2O_3$.

While $As_2O_3$ is not an essential element in any of the glass systems employed in accordance with the invention, it has known utility as a firing agent, and may possibly enhance composites comprising oxidizable reinforcing whisker phases such as SiC. Hence, antioxidant properties have been ascribed to this oxide in these composite systems.

The following example illustrates the manufacture of an extruded whisker-ceramic matrix composite according to the invention wherein barium-stuffed cordierite constitutes the principal crystal phase.

EXAMPLE IV

A glass powder suitable for the manufacture of an extruded whisker-reinforced ceramic matrix composite is produced from a melt of barium-magnesium aluminosilicate glass by a milling process. A glass consisting essentially, in weight percent on the oxide basis as calculated from the batch, of about 43.6% $SiO_2$, 37% $Al_2O_3$, 13.03% MgO, 6.2% BaO, 0.7% $As_2O_3$, and 0.1% $Cr_2O_3$ is compounded from conventional batch ingredients and formed into a glass melt by melting at 1650° C. for 16 hours. After stirring to insure melt homogeneity, the glass melt is fritted by pouring into water and the resulting coarse glass frit is milled in a ballmill for four hours to obtain thorough pulverization. The resulting glass powder has a maximum particle size of about 50 microns and an average particle size of about 10 microns.

The calcium aluminosilicate glass powder thus provided is combined with a quantity of silicon carbide whiskers to produce a homogeneous powder-whisker mixture. This mixture is prepared by adding sufficient whiskers to the powdered glass to form a mixture comprising 20% whiskers by weight, adding an isopropanol vehicle to the mixture to form a heavy slurry, and ball-milling the slurry for 4 hours. The homogeneous powder-whisker mixture thus provided is separated from the vehicle by filtration and dried.

To form an extrusion batch from the dry mixture thus provided, a methyl cellulose binder and a sodium stearate extrusion aid are added to the whisker-glass mixture as described in Example I, and the resulting batch thoroughly blended in a Littleford polyphase mixer to achieve thorough dispersion of the additives in the batch. Thereafter, the dry batch is introduced into a Lancaster countercurrent batch mixer and approximately 49 parts by weight of water for each 100 parts by weight of the dry batch are added. Mixing of this batch is continued for 0.5 hours to produce a homogeneous, plastic extrudable mass.

The extrusion batch thus provided is extruded through a rod extrusion die to produce an extruded rod having a diameter of approximately 0.25 inches. Extrusion is carried out at a pressure of approximately 100 psi.

The extruded green preform thus provided is next dried at 110° C. in a hot air oven for 16 hours, and then subjected to a burn-out treatment to remove organic binder and extrusion aid components. The preform is first heated at 50° C. per hour to 450° C., held at 450° C. for 16 hours, then further heated at 300° C. per hour to 800° C., held at 800° C. for 30 minutes, and finally cooled to room temperature. This treatment effects complete removal of organic constituents from the green preform.

The preform is next subjected to a sintering treatment to sinter the powdered glass into a continuous glass matrix phase. This sintering is carried out at ambient pressure in a nitrogen atmosphere by heating the preform at a rate of 500° C. per hour to 1450° C., thereafter holding the preform at 1450° C. for 2 hours to achieve thorough sintering without crystallization.

The crystallization of the sintered preform is next carried out, without completely cooling the preform to room temperature, by cooling the preform only to a nucleation temperature for the glass of about 900° C. and holding the sintered preform at that temperature for 2 hours to promote complete nucleation of the glassy matrix. Following this nucleation step, the nucleated preform is heated to 1200° C. and held at that temperature for 2 hours. This effects complete crystallization of the sintered glass matrix, which is transformed by the described thermal treatment to a fine-grained barium-stuffed cordierite phase.

Examination of the product thus provided shows a dense, nonporous product with good retention of the original extruded shape. Transverse modulus of rupture testing of samples prepared as described indicate an average modulus of rupture strength of 36,000 psi for the material.

Consolidation of the same extruded composition at an excessively high sintering temperature followed by crystallization as described results in a significant loss of MOR strength. Thus samples consolidated at 1500° C. rather than at 1450° C. exhibited modulus of rupture strengths averaging 18,500 psi. This is attributed to excessively low viscosity of the glass at higher temperature, resulting in deformation and flow of the rod with poor consolidation, rather than surface-energy-controlled sintering.

Examples of additional barium-magnesium aluminosilicate glasses which are thermally crystallizable to yield a principal crystal phase consisting essentially of barium-stuffed cordierite, and which can be effectively consolidated at ambient pressure and crystallized to strong high-density products, are reported below in Table II. Included in Table II for each of a number of illustrative thermally crystallizable glasses are an identification of the various oxide constituents making up the glass, including the relative concentrations thereof in parts by weight, again approximating weight percent. The consolidation temperatures for the glasses reported in Table II will typically fall in the range of about 1425° C.–1525° C., with the optimum temperature range in each case again being determined from the liquids temperature of each glass as measured in accordance with known analytical practice.

TABLE II

| Composition | 16 | 17 | 18 | 19 | 20 |
|---|---|---|---|---|---|
| SiO$_2$ | 43.66 | 42.4 | 43.66 | 41.52 | 43.66 |
| Al$_2$O$_3$ | 37.11 | 36.0 | 37.11 | 35.25 | 37.11 |
| MgO | 13.03 | 12.6 | 13.03 | 12.3 | 13.03 |
| BaO | 6.2 | 6.0 | 6.2 | 5.87 | 6.2 |
| As$_2$O$_3$ | 0.7 | 0.68 | 0.7 | 0.67 | 0.7 |
| ZrO$_2$ | — | 3.0 | — | 5.0 | — |
| Cr$_2$O$_3$ | 0.05 | — | — | — | — |
| SnO$_2$ | — | — | 0.1 | — | — |
| Pt | — | — | — | — | 0.01 |

Preferred BaO-MgO-Al$_2$O$_3$-SiO$_2$ glasses for the extrusion of whisker-composite barium-stuffed cordierite products will consist essentially of 41–45% SiO$_2$, 35–38% Al$_2$O$_3$, 12–14% MgO, 5–7% BaO, and 0.01–5% of a nucleating agent, most preferably selected from the group of ZrO$_2$ and Cr$_2$O$_3$. Optional constituents include 0–2% As$_2$O$_3$.

Table III below sets forth examples of calcium magnesium aluminosilicate glasses suitable for the production of extruded whisker composite products comprising a mixed anorthite-cordierite crystalline matrix in accordance with the invention. Compositions in Table III are reported in parts by weight, again approximating weight percent.

TABLE III

| Composition | 21 | 22 | 23 | 24 |
|---|---|---|---|---|
| SiO$_2$ | 42.77 | 44.77 | 41.8 | 43.85 |
| Al$_2$O$_3$ | 37.24 | 36.27 | 36.48 | 35.53 |
| MgO | 4.01 | 6.7 | 3.93 | 6.55 |
| CaO | 13.0 | 9.26 | 12.7 | 9.07 |
| As$_2$O$_3$ | 0.485 | 0.485 | 0.475 | 0.475 |
| ZrO$_2$ | 3.0 | 3.0 | 5.0 | 5.0 |
| | 25 | 26 | 27 | 28 |
| SiO$_2$ | 43.65 | 45.69 | 43.65 | 45.7 |
| Al$_2$O$_3$ | 38.0 | 37.0 | 38.0 | 37.0 |
| MgO | 4.1 | 6.8 | 4.1 | 6.8 |
| CaO | 13.3 | 9.44 | 13.3 | 9.44 |
| As$_2$O$_3$ | 0.5 | 0.5 | 0.5 | 0.5 |
| Nb$_2$O$_5$ | 0.5 | 0.5 | 1.0 | 1.0 |

Consolidation temperatures for glasses such as reported above in Table III will typically fall within the range of about 1400° C. to 1500° C. Again, the best temperature in each case can be determined from the liquidus temperature of the glass in accordance with routine analytical practice.

Preferred CaO-MgO-Al$_2$O$_3$-SiO$_2$ glasses for the production of extruded whisker composites comprising a cordierite-anorthite crystalline matrix in accordance with the invention will consist essentially, in weight percent, of about 37–50%, SiO$_2$, 32–40% Al$_2$O$_3$, 8–15% CaO, 3–10% MgO, and 0.1–2.5% of a nucleating agent, most preferably selected from the group of ZrO$_2$ and Nb$_2$O$_5$. Again, up to 2% As$_2$O$_3$ may be included as an optional constituent.

Of course the foregoing examples are merely illustrative of procedures and compositions applicable to the manufacture of extruded composite ceramic products in accordance with the invention, and numerous variations and modifications of those procedures and compositions may be resorted to in the practice of the invention as defined by the appended claims.

We claim:
1. A method for making a whisker-reinforced ceramic matrix composite article which comprises the steps of
  (a) compounding an extrusion batch comprising an extrusion vehicle component and a solids component, the solids component comprising 1–30% by weight of inorganic whiskers and 70–99% of a powdered thermally crystallizable RO-Al$_2$O$_3$-SiO$_2$ glass, wherein RO is an oxide selected from the group consisting of CaO, MgO and BaO, and the glass containing an internal nucleating agent and being of a composition crystallizable to yield anorthite, cordierite/anorthite, or barium-stuffed cordierite;
  (b) extruding the batch to provide a green ceramic preform;

(c) heating the green ceramic preform to a consolidation temperature in the range between the softening point temperature of the glass and a temperature not exceeding 150° C. above the liquidus temperature of the glass, but below the deformation temperature of the preform, heating being at a rate sufficient to retain a glassy phase constituting at least 15 volume percent of the solids component of the preform at the consolidation temperature, to provide a consolidated preform;

(d) cooling the consolidated preform to at least a temperature in the crystal nucleation range for the glass;

(e) heating the consolidated preform at a temperature in the crystal nucleation range for the glass, and maintaining the preform at a temperature in the nucleation range for a time sufficient to provide a nucleated preform; and (f) heating the nucleated preform at a temperature in the crystallization range of the glass to crystallize the glass to anorthite, cordierite/anorthite or barium-stuffed cordierite.

2. A method in accordance with claim 1 wherein the thermally crystallizable glass is a glass having a liquidus temperature not exceeding about 1600° C. selected from the group consisting of:

(a) calcium aluminosilicate glasses comprising an internal nucleating agent and being fully crystallizable to anorthite;

(b) barium-magnesium aluminosilicate glasses comprising an internal nucleating agent and being fully crystallizable to barium-stuffed cordierite; and (c) calcium-magnesium aluminosilicate glasses comprising an internal nucleating agent and being fully crystallizable to cordierite/anorthite.

3. A method in accordance with claim 2 wherein the preform is consolidated at a temperature in the range of about 1400°-1550° C. at atmospheric pressure in an inert atmosphere.

4. A method in accordance with claim 3 wherein the green ceramic preform is heated to the consolidation temperature at a heating rate in the range of about 3°-15° C. per minute and retains a glassy phase constituting 15-25 volume percent of the solids component of the preform at the consolidation temperature.

5. A method in accordance with claim 3 wherein the extrusion batch contains 5-25% by weight of SiC whiskers, wherein the thermally crystallizable glass consists essentially, in weight percent, of about 35-41% $SiO_2$, 38-46% $Al_2O_3$, 16-20% CaO, 0.1-5% of nucleating agents selected from the group consisting of $ZrO_2$ and $Nb_2O_5$, and 0-2% $As_2O_3$, and wherein the green ceramic preform is consolidated at 1400°-1550° C.

6. A method in accordance with claim 5 wherein, after the green preform has been heated to provide a consolidated preform, the consolidated preform is cooled to the nucleation range for the consolidated thermally crystallizable glass without being further cooled to ambient temperature.

7. A method in accordance with claim 3 wherein the extrusion batch contains 5-25% by weight of SiC whiskers, wherein the thermally crystallizable glass is selected from among glasses consisting essentially, in weight percent, of about 41-45% $SiO_2$, 35-38% $Al_2O_3$, 12-14% MgO, 5-7% BaO, and 0.01-5% of nucleating agents selected from the group consisting of $ZrO_2$ and $Cr_2O_3$, and 0-2% $As_2O_3$, and wherein the green ceramic preform is consolidated at 1425°-1525° C.

8. A method in accordance with claim 1 wherein the extrusion batch is extruded at an extrusion pressure in the range of about 500-2000 psi, and is heated to the consolidation temperature at atmospheric pressure.

9. A method in accordance with claim 1 wherein the green ceramic preform is heated to a consolidation temperature in the range from the liquidus temperature to about 50° C. above the liquidus temperature for the thermally crystallizable glass.

10. A method in accordance with claim 1 wherein the extrusion batch contains 5-25% by weight of SiC whiskers, wherein the thermally crystallizable glass is selected from among glasses consisting essentially, in weight percent, of about 37-50%, $SiO_2$, 32-40% $Al_2O_3$, 8-15% CaO, 3-10% MgO, and 0.01-5% of nucleating agents selected from the group consisting of $ZrO_2$ and $Nb_2O_5$, and, 0-2% $As_2O_3$, and wherein the green ceramic preform is consolidated at 1400°-1500° C.

* * * * *